UNITED STATES PATENT OFFICE.

CHARLES LUDWIG RUDOLF ERNEST MENGES, OF THE HAGUE, NETHERLANDS.

INCANDESCENT ELECTRIC LAMP.

No. 874,977.   Specification of Letters Patent.   Patented Dec. 31, 1907.

Application filed May 22, 1899. Serial No. 717,842.

*To all whom it may concern:*

Be it known that CHARLES LUDWIG RUDOLF ERNEST MENGES, a subject of the Queen of Holland, residing at Balistraat, The Hague, in the Kingdom of Holland, electrical engineer, has invented certain new and useful Improvements in Incandescent Electric Lamps, of which the following is a specification.

This invention relates to filaments for incandescent electric lamps and has for its object to produce filaments composed of an intimate mixture of a substance having electric conductivity such as metal, with a substance not having such conductivity. The non-conducting substance may be an oxid of an alkaline earth or earthy oxid, by way of example: boron nitrid or the like highly refractory substances.

The essential feature of this invention consists in that the metallic substance is not directly introduced into the incandescent conductor, but is reduced therein from its oxygen compound by carbon at a high temperature obtained by an electric current, that is, carbon in the mixture combined with the oxygen or is burned by the oxygen of the oxygen compound, this burnt carbon parting in consequence in a gaseous state, leaving the metallic substance in the filament, intimately mixed with the non-conducting substance. This method of producing the metallic substance in the incandescent conductor has the effect of obtaining an exceedingly intimate mixture of the said substance with the non-conducting substance for, as the mixing is not effected with the metallic substance in its metallic state, but with the oxygen compound of the metallic substance, the production of a very intimate mixture is much assisted by the physical similitude of the substances to be mixed.

The intimacy of the mixture may be still more improved by means of further physical or chemical agency; for example, by mixing liquid compounds (in solution or in a molten condition) of the substances required in the mixture for the filaments, which substances are then obtained in the solid state by precipitation, calcination or the like. A similar procedure is applicable if one of the substances is used in the form of a powder mixed with a liquid compound of the other substances. Instead of liquid compounds, semi-liquid or gelatinous compounds may be used. The carbon in the mixture must also be very intimately mixed with the other materials, it should be in a finely divided condition and may be conveniently obtained by the decomposition of a liquid such as tar, or syrup of sugar added to the mixture.

The mass, or carbon paste shaped in the form of the incandescent filaments by, for instance, being pressed into molds or through a mouth piece, is calcined in the absence of air. If the temperature is sufficiently raised during this calcination, the carbon paste, being carbonized becomes an electric conductor and an electric current can then be employed to heat the filament at the highest possible temperatures, so that the carbon in the mixture will reduce the oxygen compound of the metallic substance, thus producing a very finely divided metal in the incandescent conductor. This production of an exceedingly intimate mixture of metals and "oxids" is necessary in order to obtain an incandescent filament of suitable conductivity and also to prevent the metal, when softened by the high temperature, from separating the "oxid".

The proportion of the metallic and non-metallic substances in the finished filament and thus of the carbon required for reduction in the preliminary mixture, depends upon the desired resistivity of the filament in accordance with the voltage for which the lamp is destined. This invention moreover permits the employment of the mixture of "oxids" with such metals as titanium, vanadium, and uranium, which, owing to difficulties encountered in their production, have not hitherto been available for this purpose. The process is as follows:

The non-conducting substance is mixed with the solution of, say, a titanium compound. According to the "oxid" employed either titanic oxid (titanic acid) is immediately obtained in the mixture by the chemical action of the non-conducting substance on the titanium compound or it is precipitated therein by any other of the well known means, as for instance by ammonia. Of this mixture a paste is made with syrup of sugar or tar alone or with carbon in a finely divided condition. This paste is then formed into filaments by pressing it into molds or through a mouth piece. These filaments are then gradually heated in the absence of air to a sufficiently high temperature to make the carbon paste an electric conductor, and then mounted upon the platinum wires of an electric circuit and heated by an electric current *in vacuo* or in a suitable gas until the reduction of the titanic oxid to metallic titanium by the reducing action of the carbon in the mixture at that very high temperature easily obtainable by the electric current.

In the foregoing example the "oxid" was supposed to be present from the beginning of the operation. This, however, is not necessary. The titanic oxid for instance, may be employed with a solution of a salt (nitrate of magnesium for example) which, by calcination, produces the desired "oxid" in the mixture (that is magnesium oxid in the present example). The quantity of carbon necessary for the process in the mixture depends on the oxid used, the common titanium oxid in the titanium acid; but under certain circumstances I may prefer to use a lower oxid, as the purpose of the process is to deoxidize. Moreover the quantity of carbon really obtained in the preliminary mixture depends very much on the manner and time employed in carbonizing, and in consequence, it is obvious that the values indicated below are only given by way of example. As the sugar has to be carbonized in the mixture it may be preferable to introduce in it a partly carbonized or caramel state.

For eight parts of titanic oxid I use about ten parts of partly carbonized sugar. This has to be mixed with the "oxid". The quantity employed depends entirely on the electric resistance to be obtained in the filament. The quantities as indicated above contain nearly five parts of titanium. If ten times that amount, that is fifty parts of "oxid" is added, an "oxid" which for the highest voltage behaves as a perfect insulator, then the resulting filament will nevertheless possess relatively good conductivity for the usual voltages so as to make it incandescent. In consequence, it is obvious that all degrees of conductivity may be obtained by varying the relative amounts, so that the complete filament will contain only a small fraction of titanium for low conductivity, while for high conductivity the quantity of "oxid" may be only a small fraction of the whole.

The thickness or conformation of the filament previously formed may be altered either entirely or partially for instance near the point of its connection with the platinum wires, by soaking the filament in a liquid compound which contains one of the substances of the mixture which substance is then precipitated by heat or other suitable means. The incandescent body may also be composed of a mixture of more than two substances. The production of light by these filaments, is possibly due only to the high temperature sustained by the substance specified and produced by the electric current having to pass the high resistance offered by various substances of the mixture. However, it is thought that possibly the discontinuity of the incandescent body either directly or indirectly, through the effect of the successive decomposition of each molecule at one side and its recomposition at the other side produces a discontinuity in its electric conditions in such a manner as to furnish, at least partially, a direct transformation of the electric energy into short electrical waves, that is into light.

What I claim is—

1. The process of producing incandescent conductors or filaments for electric lamps, consisting in intimately mixing a material having electric conductivity with a non-conducting substance, by producing in the shape of the incandescent conductor, a mixture of the non-conducting substance, carbon, and an oxygen compound of a metal and heating said mixture by an electric current until the carbon by its combination with the oxygen of the named compound parts in the gaseous state, leaving the metallic material in the filament.

2. The process of producing incandescent conductors or filaments for electric lamps, consisting in intimately mixing titanium with a non-conducting substance, by producing in the shape of the incandescent conductor, a mixture of the non-conducting substance, carbon, and an oxygen compound of titanium, and heating said mixture by an electric current until the carbon by its combination with the oxygen of the named compound parts in the gaseous state, leaving the metallic titanium in the filament.

3. The process of producing incandescent conductors for electric lamps formed by an intimate mixture of metallic electric conductive titanium with a non-conducting substance which consists in producing in the shape of the incandescent conductor, a mixture of an oxygen compound of titanium carbon and the non-conducting substance and heating said mixture by an electric current until the metallic titanium is reduced from its compound.

4. The process of producing incandescent conductors for electric lamps formed by an intimate mixture of metallic electric conductive titanium with a non-conducting substance, which consists in producing a paste formed by mixing an oxygen compound of titanium in a fluid condition, carbon, and a non-conducting substance, shaping said paste into an incandescent filament, heating said filament until it becomes an electric conductor, and further heating the same by an electric current until the metallic titanium is reduced from its compound.

In testimony whereof I have hereunto set my hand in presence of two subscribing witnesses this twelfth day of May 1899.

CHARLES LUDWIG RUDOLF ERNEST MENGES.

Witnesses:
  G. VAASFEN,
  A. VAN STRATEN.